United States Patent [19]
Maki

[11] Patent Number: 5,884,199
[45] Date of Patent: Mar. 16, 1999

[54] PORTABLE WIRELESS RECEIVER

[75] Inventor: Hiroshi Maki, Zama, Japan

[73] Assignee: Kabushiki Kaisha Kenwood, Tokyo, Japan

[21] Appl. No.: 744,658

[22] Filed: Nov. 6, 1996

[30] Foreign Application Priority Data

Nov. 13, 1995 [JP] Japan ................................. 7-317051

[51] Int. Cl.$^6$ ........................................................ H04B 1/08
[52] U.S. Cl. ......................... 455/575; 455/568; 455/351; 455/456
[58] Field of Search ..................................... 455/426, 427, 455/575, 90, 50, 95, 12.1, 569, 568, 456, 457, 351, 347, 66, 79; 379/420, 430, 446; 381/183; 342/457, 357

[56] References Cited

U.S. PATENT DOCUMENTS

| 4,325,142 | 4/1982 | Nakazawa | 455/95 |
| 4,340,972 | 7/1982 | Heist | 455/95 |
| 4,620,068 | 10/1986 | Wieder | 455/575 |
| 5,223,843 | 6/1993 | Hutchinson | 455/12.1 |
| 5,422,816 | 6/1995 | Sprague et al. | 455/575 |
| 5,448,773 | 9/1995 | McBurney et al. | 455/12.1 |
| 5,506,588 | 4/1996 | Diefes et al. | 455/12.1 |

*Primary Examiner*—Thanh Cong Le
*Assistant Examiner*—Hoa Huy Do
*Attorney, Agent, or Firm*—Sixbey, Friedman, Leedom & Ferguson, P.C.; Gerald J. Ferguson, Jr.

[57] ABSTRACT

A portable wireless receiver is provided which has a position locating function through reception of GPS satellite radio waves. The portable wireless receiver has a speaker/microphone unit including a GPS antenna, a speaker, and a microphone built in the unit.

5 Claims, 3 Drawing Sheets

【FIG. 1】
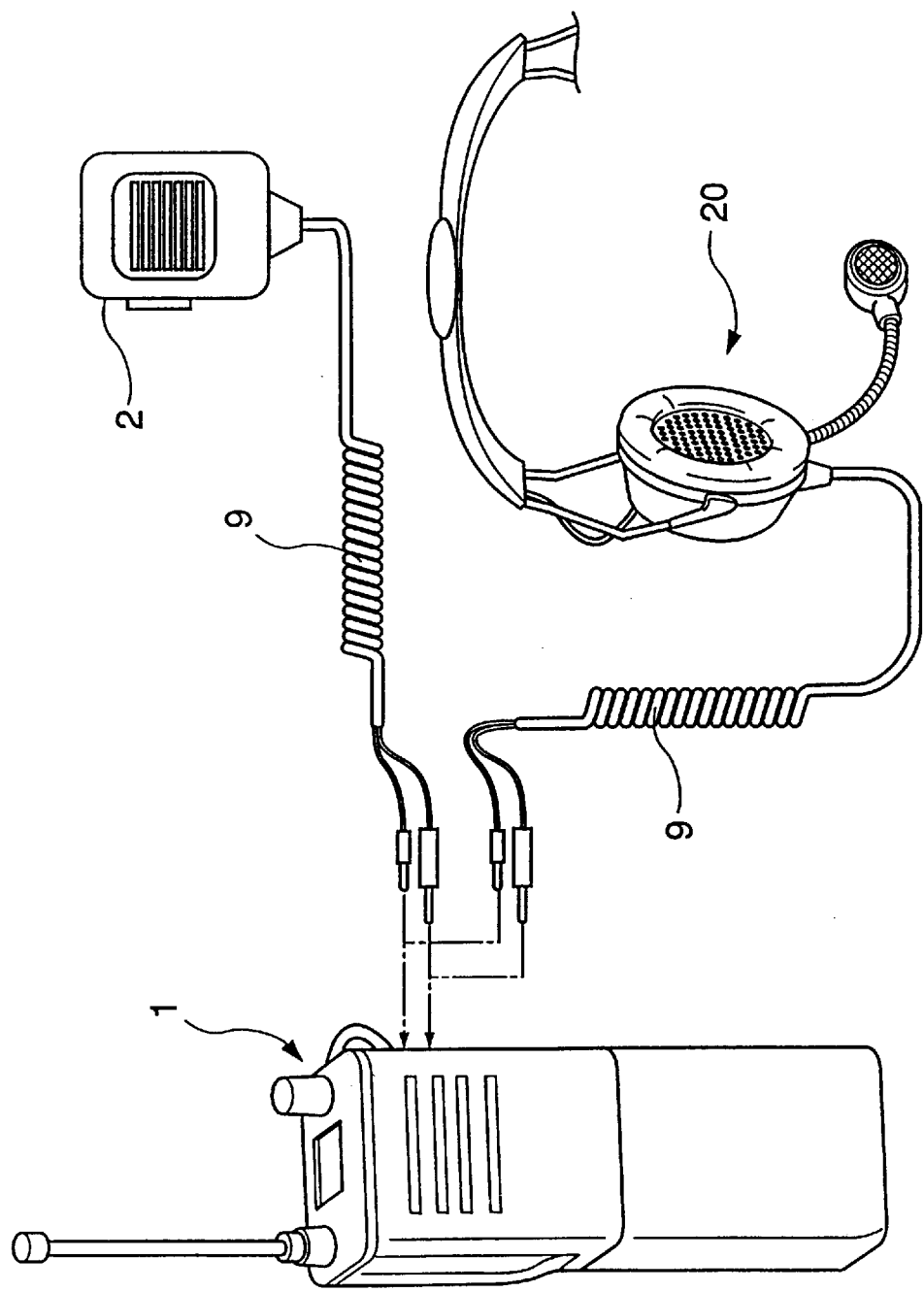

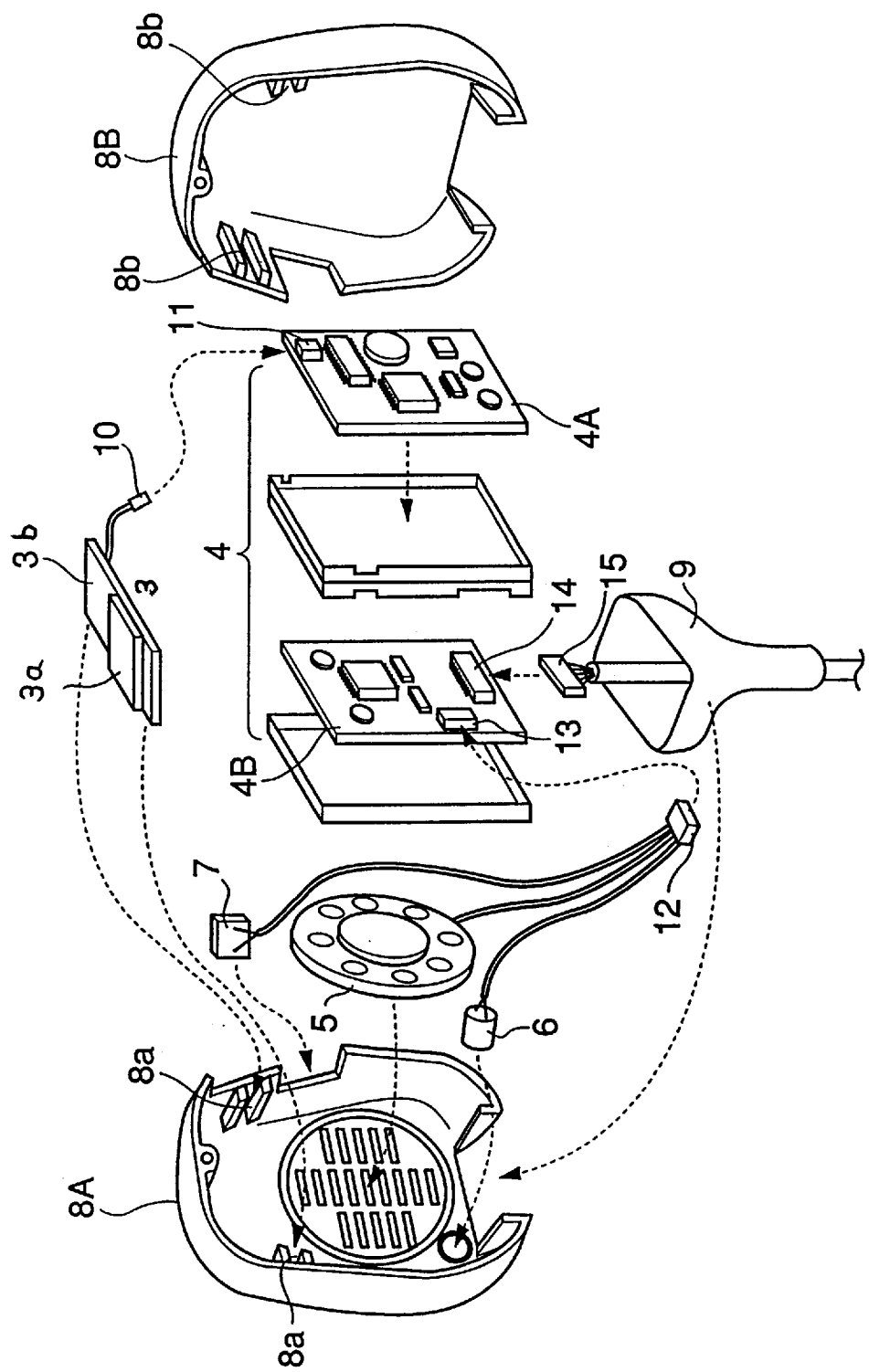
[FIG. 2]

[FIG. 3]
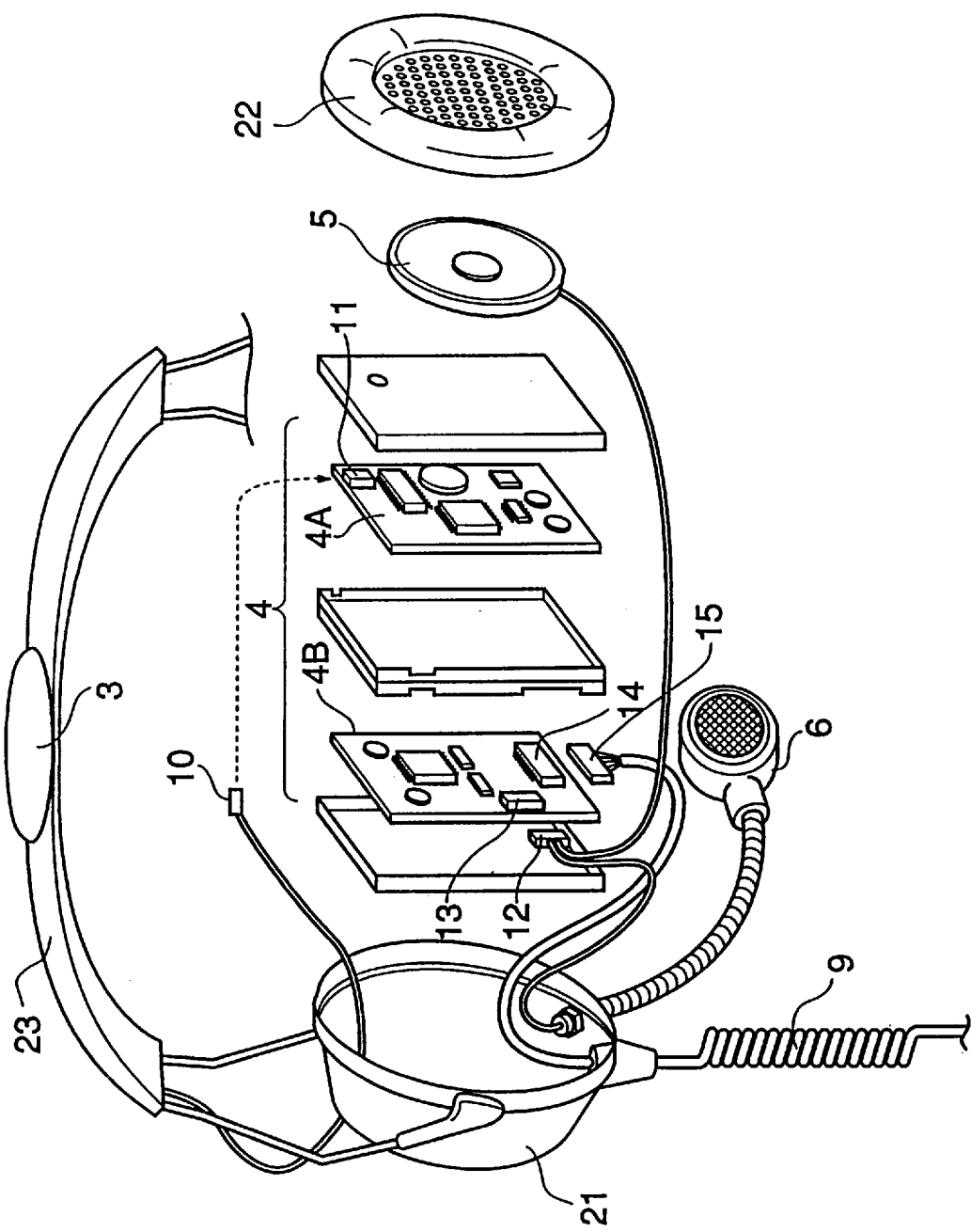

PORTABLE WIRELESS RECEIVER

BACKGROUND OF THE INVENTION

1. Field of the Invention

The present invention relates to a portable wireless receiver capable of reliably receiving GPS (global positioning system) satellite radio waves.

2. Related Background Art

In communications by using a conventional portable wireless receiver having a speaker/microphone unit or head set, the wireless receiver main body itself is in many cases held by the belt of a user at the waist position.

The position of a GPS receiver can be measured by receiving radio waves from GPS (global positioning system) satellites, as disclosed in Japanese Patent Laid-open Publication No. 6-15022. The position of the antenna of this receiver is at the waist as shown in FIG. 5 of the Publication. Since the antenna is at the low position of the human body, the human body becomes a shade (obstacle) of satellite radio communications and good communications are sometimes difficult.

A portable receiver capable of GPS radio wave reception disclosed in Japanese Patent Laid-open Publication No. 6-230104 is not possible to communicate while it is carried by a user in motion because the GPS antenna is required to be picked up from a case and set properly.

A police or guard man carrying a portable wireless receiver can communicate with a police station or guard headquarter to inform the contents of an accident, the position of an accident site, or the like when the accident occurs during patrol.

However, in some cases, speech communications with a police station or guard headquarter to inform the contents of an accident or the position of an accident site were impossible in some cases if there is no sufficient time to inform in an urgent state. A portable wireless receiver capable of informing the position of a user even in such cases without speech communications has long been desired.

SUMMARY OF THE INVENTION

It is an object of the present invention to provide a portable wireless receiver having a position locating function through reception of GPS satellite radio waves.

A portable wireless receiver of the invention comprises a speaker/microphone unit including a GPS antenna, a speaker, and a microphone built in the unit. The speaker/microphone unit further includes a GPS receiver unit.

The speaker/microphone unit may further include a press-to-talk switch and/or VOX circuit.

The GPS antenna is disposed at the upper portion of the speaker/microphone unit.

A portable wireless receiver of this invention comprises a headset unit including a GPS antenna, a speaker, a microphone, and a head support member.

The headset unit further includes a GPS receiver unit. The headset unit may further include a press-to-talk switch and/or VOX circuit.

The GPS antenna is disposed at the head support member.

A portable wireless receiver is constituted of a wireless receiver main body and a speaker/microphone unit or headset. The speaker/microphone unit or headset has a GPS antenna and GPS receiver unit built therein.

A user carrying this portable wireless receiver can perform radio wave communications by the wireless receiver main body, and can automatically notify the position of the user.

BRIEF DESCRIPTION OF THE DRAWINGS

FIG. 1 is a schematic diagram of a portable wireless receiver according to an embodiment of the invention.

FIG. 2 is a broken perspective view of a speaker/microphone unit shown in FIG. 1.

FIG. 3 is a broken perspective view of a headset shown in FIG. 1.

DETAILED DESCRIPTION OF THE PREFERRED EMBODIMENTS

FIG. 1 is a schematic diagram of a portable wireless receiver according to an embodiment of the invention. In FIG. 1, the portable wireless receiver is constituted of a wireless receiver main body 1 and a speaker/microphone unit 2 or headset 20 connected to the wireless receiver main body 1.

The wireless receiver main body 1 has an antenna 1a mounted thereon for transmission/reception of radio waves by a built-in transceiver unit (not shown).

As shown in FIG. 2, the speaker/microphone unit 2 is constituted of including a GPS antenna 3 (inclusive of a low noise amplifier), a GPS receiver unit 4 including a GPS receiver unit substrate 4A and a modem substrate 4B, a speaker 5, a microphone 6, and a press-to-talk (PTT) switch 7, respectively housed in a case 8 including a front case 8A and a rear case 8B, and is connected to the wireless receiver main body 1 via a connector cable 9. The GPS antenna 3 is fitted in engaging grooves 8a and 8b integrally formed with the upper portions of the front and rear cases 8A and 8B. A connector 10 of the antenna 3 is connected to a connector 11 of the GPS receiver unit substrate 4A.

The speaker 5, microphone 6, and PTT switch 7 are disposed at predetermined positions of the case 8, and connected via their connector 12 to a connector 13 of the modem substrate 4B. A main connector 14 of the modem substrate 4B is connected to a connector 15 of the connector cable 9.

When this wireless receiver 1 is used, the wireless receiver main body 1 is held by a waist belt of a user, e.g., a police, and the speaker/microphone unit 2 is put, for example, in a chest pocket or held by a shoulder belt.

For speech communications with a police station, the police pushes the PTT switch 7 of the speaker/microphone unit 2 with a finger or chin to receive instructions of the police station from the speaker 5.

Radio waves from GPS satellites are received by the GPS antenna 3 of the speaker/microphone unit 2 put in the chest or shoulder pocket and processed at the receiver unit substrate 4A to obtain position information. This position information is supplied from the modem substrate 4B to the wireless receiver main body 1 via the connector cable 9 and transmitted from the transmitter unit via the antenna 1a to the police station.

Since the GPS antenna 3 is disposed at the upper portion of the speaker/microphone unit 2, there is no obstacle between the speaker/microphone unit 2 and GPS satellites, and good reception of GPS radio waves is possible.

Therefore, even if the police is in an urgent state under some accidents and unable to have wireless communications, the police station can receive the position information and always confirm the position of the police so that this state can be dealt with urgently, such as moving a patrol car to the accident site quickly.

A voice operated transmission (VOX) circuit may be provided on the modem substrate 4B or wireless receiver main body 1, instead of, or together with, the PTT switch 7. In this case, even if the PTT switch 7 is not depressed, voices of the police can be detected by the VOX circuit and it becomes possible to perform automatic speech communications.

The GPS receiver unit 4 may be housed in the wireless receiver main body 1 in place of the speaker/microphone unit 2.

Instead of the speaker/microphone unit 2, the headset 20 may be used being connected to the wireless receiver main body 1 shown in FIG. 1.

As shown in FIG. 3, the headset 20 is constituted of a GPS antenna 3 (inclusive of a low noise amplifier), a GPS receiver unit 4 including a GPS receiver unit substrate 4A and a modem substrate 4B, and a speaker 5, respectively built in a housing 21 which is covered with a speaker pad member 22. The housing 21 is mounted with a head support member 23 and a microphone 6. The headset 20 is connected via a connector cable 9 to the wireless receiver main body 1. The GPS antenna 3 is mounted near at the center of the head support member 23, and its connector 10 is connected to a connector 11 of the GPS receiver unit substrate 4A. The speaker 5 and microphone 6 are connected via a connector 12 to a connector 13 of the modem substrate 4B. A main connector 14 of the modem substrate 4B is connected to a connector 15 of the connector cable 9.

As can be seen in FIG. 2, a GPS antenna element 3a comprises a ground conductive plate of square shape, radiation patch plate and dielectric sandwiched between the ground conductive plate and the radiation patch plate. The GPS antenna element 3a is mounted on a print board 3b of square shape, the width of which is about the same as that of the ground conductive plate and the length of which is longer than that of the ground conductive plate. The print board 3b serves as a reflector of the GPS antenna 3a.

The wireless receiver main body 1 is held by a user, e.g., a guard man at a waist belt, and the headset 20 is held by the head support member 23 on the head. The guard man communicates with the guard headquarter from the microphone 6 and receives instructions from the guard headquarter via the speaker 5.

Radio waves from GPS satellites are received by the GPS antenna 3 mounted on the head support member 23 and processed at the receiver unit substrate 4A to obtain position information. This position information is transmitted from the transmitter unit of the wireless receiver main body 1 to the guard headquarter.

Since the GPS antenna 3 is disposed on the head support member 23, there is no obstacle between the headset 20 and GPS satellites, and good reception of GPS radio waves is possible.

In an upper portion of the inside wall of a housing 8 of the speaker/microphone unit which comprises halves 8A and 8B, there are provided ditch channels 8a and 8b, as shown in FIG. 2. The opposite edges of the print board 3b of the GPS antenna are inserted into the ditch channels 8a and 8b.

The hook for fixing the speaker/microphone unit to a guardman cloth such as shoulder belt is provided at a higher position in gravity center of the speaker/microphone unit so that the GPS antenna always faces toward a sky when it is fixed to the guardman. Therefore, even if the guard man is in an urgent state because of some reasons and unable to have wireless communications, the guard headquarter can always confirm the position of the guard man so that this state can be dealt with properly.

A PTT switch and/or VOX circuit may be mounted on the headset 20, connector cable 9, or wireless receiver main body 1 at its proper position.

The GPS receiver unit 4 may be housed in the wireless receiver main body 1 in place of the headset unit 20.

According to the present invention, the position of a user carrying a portable wireless receiver can be always located. Furthermore, since the GPS antenna of the portable wireless receiver in use is always positioned at the upper portion of the human body and there is no obstacle between the GPS antenna and GPS satellites, good reception of GPS radio waves is possible.

What is claimed is:

1. A portable wireless receiver comprising a wireless receiver unit for communicating with, a station, speaker and microphone which are used for an operator to communicate with the station by the wireless receiver unit, GPS antenna and GPS receiver for communicating with a satellite via said GPS antenna to get a location information antenna and sending the location information to the station via said wireless receiver unit,

CHARACTERIZED IN THAT said speaker and microphone, GPS antenna and GPS receiver are contained within a single speaker/microphone unit housing which is fixed to the operator, said GPS antenna is disposed at the upper portion of said speaker/microphone unit housing, and is mounted on a print board serving as a reflector.

2. A portable wireless receiver according to claim 1, wherein said speaker/microphone unit housing further includes a press-to-talk switch and/or VOX circuit.

3. A portable wireless receiver according to claim 1, wherein said print board is disposed between ditch channels provided on an inside wall of the upper portion of said speaker/microphone unit housing.

4. A portable wireless receiver provided with a head set comprising a wireless receiver unit for communicating with, a station, speaker and microphone which are used for an operator to communicate with the station by the wireless receiver unit, GPS antenna and GPS receiver for communicating with a satellite via said GPS antenna to get a location information and sending the location information to the station via said wireless receiver unit,

CHARACTERIZED IN THAT said speaker and GPS receiver are contained within an earphone housing of the headset and said GPS antenna is mounted onto the top of a head supporting member.

5. A portable wireless receiver according to claim 4, wherein said headset unit further includes a press-to-talk switch and/or VOX circuit.

* * * * *